United States Patent
Ruopp et al.

(10) Patent No.: US 10,279,858 B2
(45) Date of Patent: May 7, 2019

(54) HANDLEBAR FASTENER FOR A SWITCHGEAR UNIT

(71) Applicant: Gustav Magenwirth GmbH & Co. KG, Bad Urach (DE)

(72) Inventors: Michael Ruopp, Berghülen (DE); Christian Neutsch, Reutlingen (DE)

(73) Assignee: Gustav Magenwirth GmbH & Co. KG (DE)

( * ) Notice: Subject to any disclaimer, the term of this patent is extended or adjusted under 35 U.S.C. 154(b) by 151 days.

(21) Appl. No.: 15/295,568

(22) Filed: Oct. 17, 2016

(65) Prior Publication Data
US 2017/0106934 A1   Apr. 20, 2017

(30) Foreign Application Priority Data
Oct. 16, 2015   (DE) .......................... 10 2015 220 239

(51) Int. Cl.
  *B62K 23/02*   (2006.01)
  *B62L 3/02*    (2006.01)
  *B62M 25/04*   (2006.01)
  *B62K 23/06*   (2006.01)
  *B62K 21/12*   (2006.01)

(52) U.S. Cl.
  CPC ............... *B62K 23/06* (2013.01); *B62L 3/02* (2013.01); *B62L 3/023* (2013.01); *B62M 25/04* (2013.01); *B62K 21/12* (2013.01)

(58) Field of Classification Search
  CPC ........ B62K 21/12; B62K 23/06; B62M 25/04; B62L 3/023; B62L 3/02
  See application file for complete search history.

(56) References Cited

U.S. PATENT DOCUMENTS

| 4,974,469 A | 12/1990 | Romano |
| 8,375,825 B2* | 2/2013 | Hirose ...................... B60T 7/08 74/489 |
| 9,073,595 B2* | 7/2015 | Miki ...................... B62K 23/02 |
| 9,174,697 B2* | 11/2015 | Miki ...................... B62K 23/02 |
| 9,381,971 B2* | 7/2016 | Miki ...................... B62K 23/06 |
| 9,550,544 B2* | 1/2017 | Takeuchi ............... B62K 23/06 |
| 9,708,023 B2* | 7/2017 | Esposito ................ B62K 11/14 |

FOREIGN PATENT DOCUMENTS

| DE | 10 2013 012 311 A1 | 7/2010 |
| DE | 10 2010 047 855 A1 | 10/2010 |
| DE | 20 2014 000 348 U1 | 4/2014 |
| DE | 10 2014 013 972 A1 | 9/2014 |
| DE | 10 2014 009 590 A1 | 12/2014 |
| DE | 10 2014 014571 A1 | 5/2015 |

OTHER PUBLICATIONS

Search Report for European Patent App. No. 16 19 3394.0 dated Mar. 10, 2017.
Search Report for German Patent App. No. 10 2015 200 239.9 dated Jul. 26, 2016.

* cited by examiner

*Primary Examiner* — Adam D Rogers
(74) *Attorney, Agent, or Firm* — Gregory L. Mayback

(57) ABSTRACT

A vehicle steered by handlebars has a handlebar tube. A handlebar fastener for a switchgear unit includes an adapter device for receiving the switchgear unit and a fastening device for fastening the adapter device to the handlebar tube of the vehicle steered by handlebars. The adapter device has a torque support device.

10 Claims, 10 Drawing Sheets

HANDLEBAR FASTENER FOR A SWITCHGEAR UNIT

CROSS-REFERENCE TO RELATED APPLICATIONS

This application claims the priority, under 35 U.S.C. §§ 119, 120, 172, 363, 365, and 371, of, of German patent application No. DE 10 2015 220 239.9, filed Oct. 16, 2015; the prior application is herewith incorporated by reference in its entirety.

STATEMENT REGARDING FEDERALLY SPONSORED RESEARCH OR DEVELOPMENT

Not Applicable

FIELD OF THE INVENTION

The present systems, apparatuses, and methods relate to a handlebar fastener for a switchgear unit, comprising an adapter device for receiving the switchgear unit and a fastening device for fastening the adapter device to the handlebar tube of a vehicle or bicycle steered by handlebars.

BACKGROUND OF THE INVENTION

Handlebar fasteners are known that serve to fasten switchgear units to the handlebar tube of a vehicle or bicycle steered by handlebars. These handlebar fasteners have two half shells that jointly enclose the handlebar tube and are screwed together by bolts in order to be fastened to the handlebar tube.

The switchgear unit has two levers by which the gears of the gearing can be switched. When one lever of the switchgear unit is actuated, a cable is pulled, and when the other lever of the switchgear unit is actuated, the cable is released. Because the two levers are actuated by the fingers of the driver of the vehicle and, in doing so, the hand encloses the handlebar tube, the levers are below the handlebar tube. When the lever is actuated, a torque is exerted on the handlebar fastener, in particular, when actuating the lever that pulls the cable as a result of the actuation. Because the gear is usually shifted while driving, there is the danger that the handlebar fastener becomes released due to the frequent torque changes. Therefore, the known handlebar fasteners have to be relatively stable and heavy so that the handlebar fastener cannot be released easily or the handlebar fastener does not move about the handlebar tube.

Thus, a need exists to overcome the problems with the prior art systems, designs, and processes as discussed above.

SUMMARY OF THE INVENTION

The systems, apparatuses, and methods described provide a handlebar fastener for fastening a switchgear unit to a handlebar tube that overcomes the hereinafore-mentioned disadvantages of the heretofore-known devices and methods of this general type and that provide such features with a the reduced danger of releasing the handlebar fastener at the handlebar tube due to frequent switching.

With the foregoing and other objects in view, there is provided, a handlebar fastener for a switchgear unit with an adapter unit for receiving the switchgear unit and a fastening device for fastening the adapter device at the handlebar tube of a vehicle steered by handlebars, the adapter device having a torque support device.

The embodiment of the handlebar fastener has the advantage that a torque exerted on the handlebar fastener on actuation of the switchgear unit can be distributed directly to the handlebar tube through the torque support device of the adapter device, as a result of which the fastening device will not rotate on the handlebar because, if at all, there is only a minor torque that acts on the frictional connection between the fastening device and the handlebar tube. The advantage of this is that the fastening device can be lighter, which is, in particular, very advantageous for racing equipment because weight plays a decisive part.

In accordance with another feature, the fastening device can be a clamp, the inner contour of which preferably corresponds to the outer contour of the handlebar tube. The fastening device can preferably enclose the handlebar tube together with a master cylinder. The fastening device or clamp can preferably be made as a half shell.

Alternatively or additionally, the torque support device can be disposed and made such way that it is supported off-center on the handlebar tube when the adapter device is fastened to the handlebar tube by the fastening device.

"Off-center" refers to a region, the center of gravity of which or which is located substantially or fully below a plane that extends through the center of the handlebar tube and parallel to the direction of force that is exerted on the switchgear unit during switching.

In accordance with a further feature, the torque support device can have one rib or a plurality of ribs, the contours of which correspond, in a certain angular range, to the outer contour of the handlebar tube. The angular range can here be at least 30 degrees, in particular, at least 45 degrees, more particularly, at least 60 degrees and, particularly, about 70 degrees or 90 degrees.

In accordance with an added feature, the torque support device can have one rib or a plurality of ribs, the contours of which correspond, in a certain angular range, to the outer contour of the handlebar tube. The angular range can here be less than 180 degrees, in particular, less than 150 degrees, more particularly, less than 120 degrees and, particularly, about 90 degrees or 70 degrees.

In accordance with an additional feature, the torque support device can have a second torque support region that can be disposed on the opposite side of the handlebar tube when the handlebar fastener is mounted on the handlebar tube.

"Opposite side" refers to a region that, based on a plane passing through the center of the handlebar tube that is parallel to the force exerted on the switchgear unit during switching, is on the side of the handlebar tube that is opposite to the side on which the adapter device is disposed in order to receive the switchgear unit.

In accordance with yet another feature, the second torque support region can have one rib or a plurality of ribs, the contours of which correspond, in a certain angular range, to the outer contour of the handlebar tube. The angular range can here be at least 30 degrees, in particular, at least 45 degrees, more particularly, at least 60 degrees and, particularly, about 90 degrees.

In accordance with yet a further feature, the torque support device can have two ribs, between which an engagement opening for a bolt can be provided to fasten the switchgear unit to the adapter device.

In accordance with yet an added feature, the fastening device can have an adapter support device for receiving the adapter device. The advantage of this is that various adapter devices can be disposed on the fastening device to adapt the handlebar fastener to various switchgear units. The advantage of this is that a plurality of handlebar fasteners can be made in a more cost-effective way.

The systems, apparatuses, and methods described adapt handlebar fasteners for receiving switchgear units to new switchgear units in a fast and cost-effective way.

The systems, apparatuses, and methods described also provide a handlebar fastener for a switchgear unit having an adapter device for receiving the switchgear unit and a fastening device for fastening the adapter device to the handlebar tube of a vehicle steered by handlebars, the fastening device having an adapter support device for receiving the adapter device.

An advantage of this exemplary embodiment is that, due to the modular design, only the adapter device has to be adapted to the new switchgear units, thus saving design and manufacturing costs. Repair costs can also be reduced because it is not the entire handlebar fastener that has to be exchanged.

In accordance with yet an additional feature, the adapter device can be rotatably mounted in the adapter support device. The advantage of this is that the torque produced on actuating the switchgear unit can be better distributed to the torque support device and, thus, directly to the handlebar tube.

Alternatively or additionally, the adapter device can be rotationally mounted in the adapter support device about an axis that is substantially parallel to the axis of the handlebar tube.

In accordance with again another feature, the adapter device can have a switchgear unit support device for receiving the switchgear unit.

In accordance with again a further feature, the adapter device can be attachable to the switchgear unit by a bolt or a threaded pin.

In accordance with again an added feature, the adapter device can have an adjusting device for adjusting the angle at which the switchgear unit is received by the adapter device.

In accordance with again an additional feature, the adapter device can have an adjusting device having a stop for receiving the switchgear unit support device of the adapter device and a switchgear unit support device for receiving the switchgear unit.

In accordance with still another feature, the adapter device can have an adjusting device for adjusting the angle at which the adapter device is received by the fastening device.

In accordance with still a further feature, the adjusting device can have a spring device and a bolt, both received in a corresponding opening or bore that is provided in the adapter device.

In accordance with still an added feature, a plurality bores can be provided around the bolt support, by which different angles can be adjusted between the adapter device and the fastening device.

In accordance with a concomitant feature, there is provided a master cylinder for a hydraulic brake with a handlebar fastener that is formed according to the hereindescribed.

The systems, apparatuses, and methods are described herein by the embodiments shown in the drawings. The following reference signs are used, some of which are provided with an apostrophe, inverted commas or Latin letters A or B to designate equal parts from different designs of the invention:

1 handlebar tube
2 plane through the center of the handlebar tube parallel to the force which is exerted on the switchgear unit (not shown) during switching
10 fastening device
11 handlebar tube support
12 bolt support
13 bolt support
20 adapter device
21 bolt support device
22 torque support device
23 bolt support
24 switchgear unit support device
25 bore
26B engagement opening
27A second torque support region
30 adapter support device
31 fork bottom
32 fork leg
33 fork leg
34 bore
35A passage
39 bolt
40 bolt
41 bolt head
42 bolt shaft
43 tool engagement
50 adjusting device
51 stop set
52 adjusting wheel
53 switchgear unit support device
61 fastening bolt
62 fastening bolt
70 adjusting device
71 spring device
72 bolt
73 end
100 master cylinder
110 lever
120 housing
130 fastening device
140 hydraulic line Although the systems, apparatuses, and methods are illustrated and described herein as embodied in a handlebar fastener for fastening a switchgear unit to a handlebar tube, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
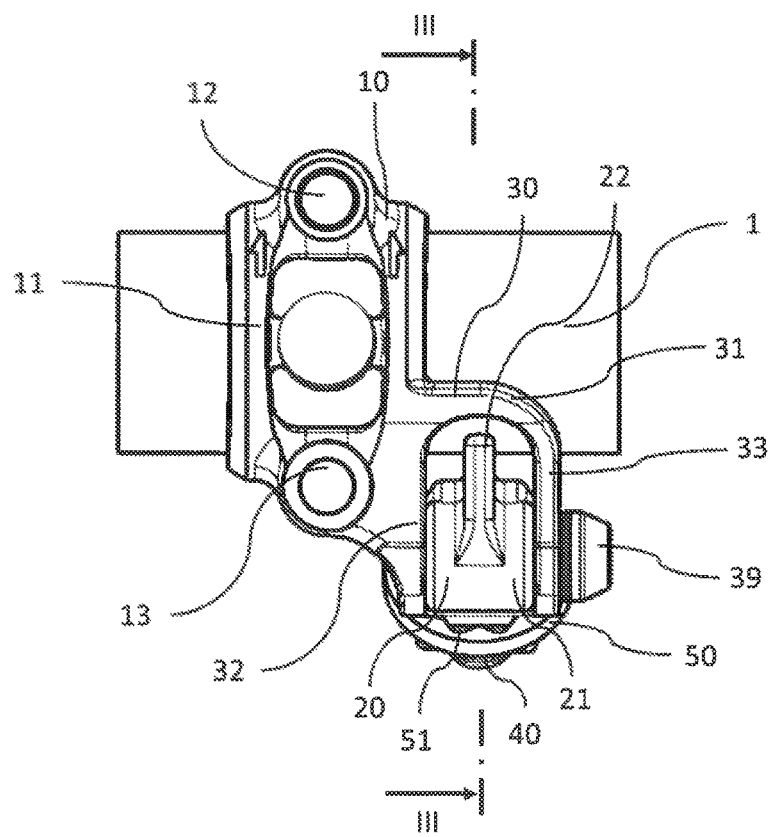
FIG. 1 is a rear elevational view of a first exemplary handlebar fastener for fastening a switchgear unit (not shown) to a handlebar tube.
Figure 2:
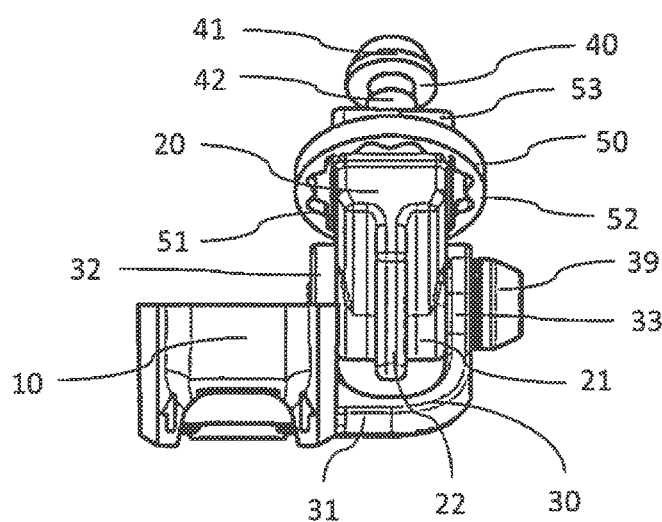
FIG. 2 is a top plan view of the handlebar fastener of FIG. 1, the handlebar tube not being shown.
Figure 3:
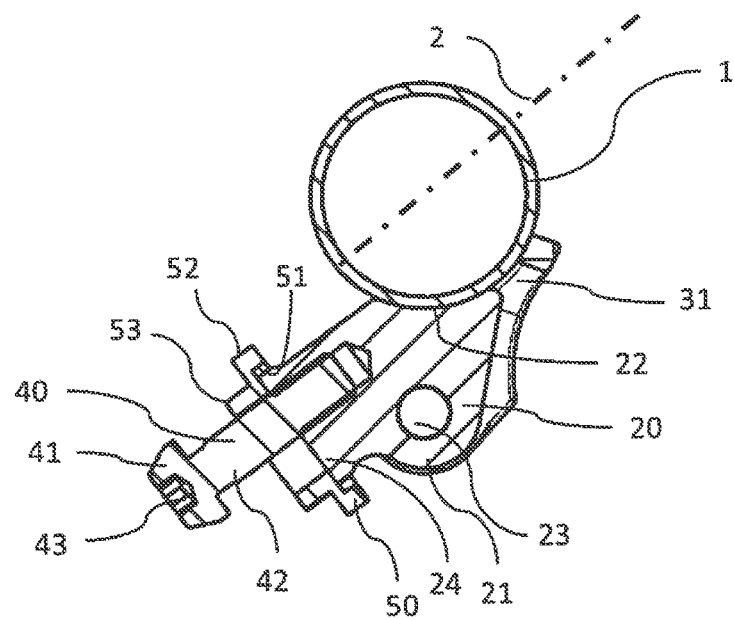
FIG. 3 is a cross-sectional view of the handlebar fastener of FIG. 1 along line III-III of FIG. 1.
Figure 4:
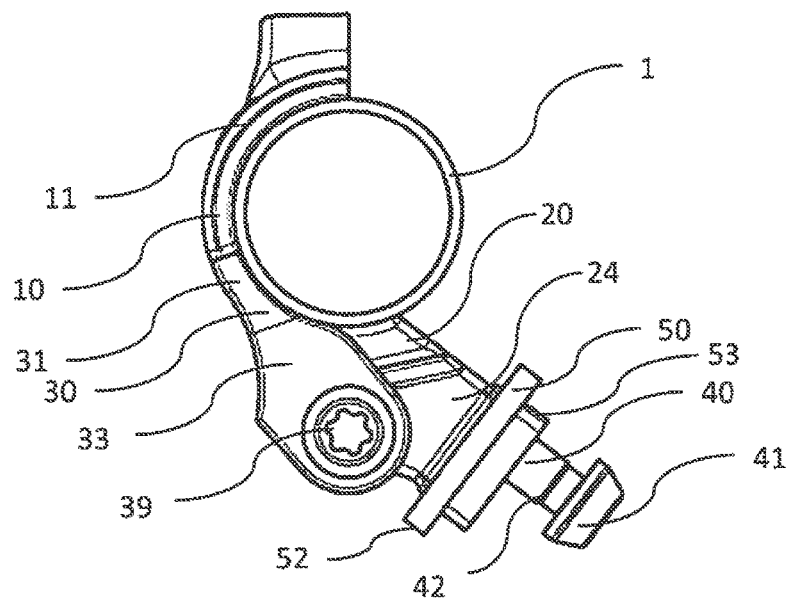
FIG. 4 is a side elevational view of the handlebar fastener of FIG. 1.
Figure 5:
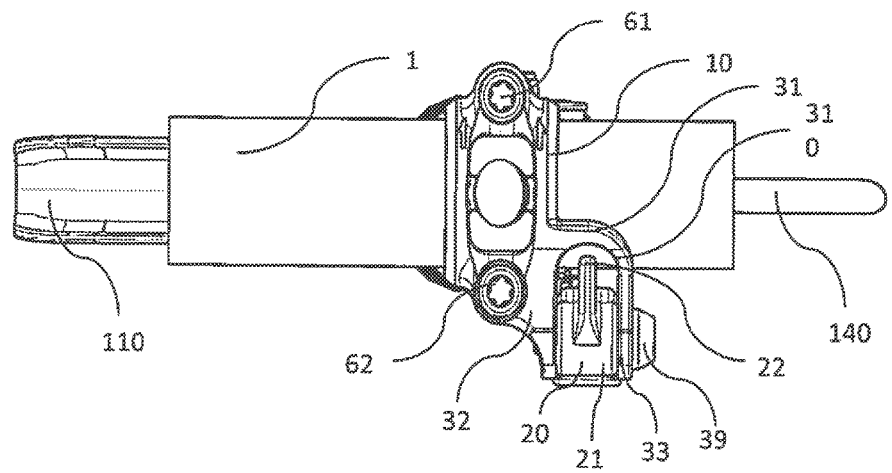
FIG. 5 is a fragmentary, rear elevational view of the handlebar fastener of FIG. 1 in the form of a master cylinder of a hydraulic bicycle brake.
Figure 6:
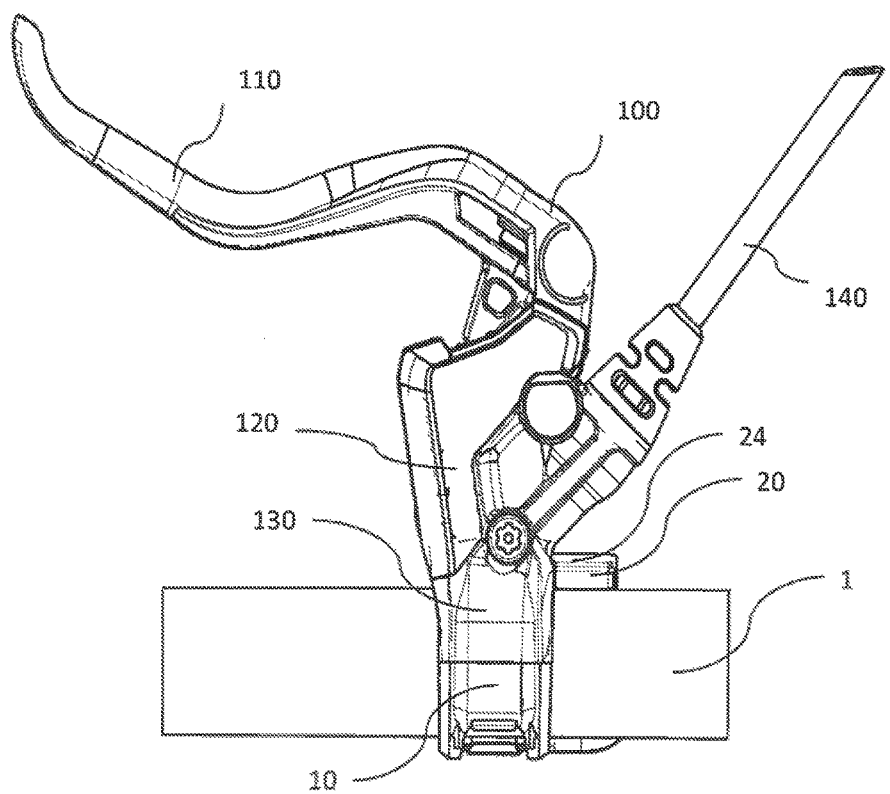
FIG. 6 is a fragmentary, top plan view of the handlebar fastener of FIG. 1 in the form of a master cylinder of a hydraulic bicycle brake attached to a handlebar tube section.
Figure 7:
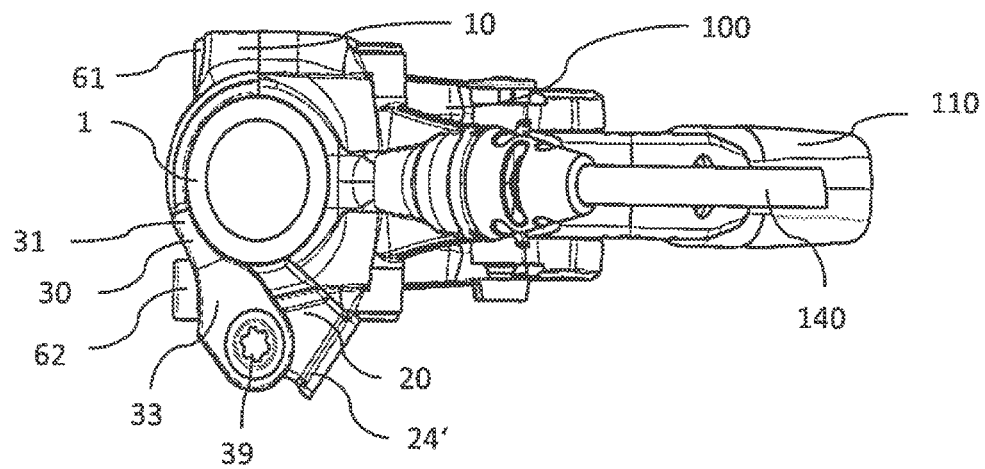
FIG. 7 is a side elevational view of the handlebar fastener of FIG. 1 in the form of a master cylinder of a hydraulic bicycle brake.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 to 7, there is shown a first exemplary embodiment of a handlebar attachment.

The handlebar fastener has a fastening device 10 including a handlebar tube support 11. The handlebar tube support 11 is made as a clamp or half shell, the inner contour of which corresponds to the outer contour of the handlebar tube. Bolt supports 12, 13 or openings are provided in the handlebar tube support 11, one on each side. The fastening device 10 is made such that it encloses the handlebar tube 1 together with another fastening device and can be attached thereto. The further fastening device can be a simple clamp so as to carry out a separate fastening to the handlebar tube.

According to an exemplary embodiment shown in the drawings, the further fastening device 130 is part of a master cylinder 100 of a hydraulic bicycle brake. See, e.g., FIG. 6. The further fastening device 130 can also be part of another master device, e.g., hydraulic clutch actuation or a mechanical brake actuation device.

The hydraulic master cylinder 100 has a lever 110, a housing 120 and a hydraulic line 140. A hydraulic master device is disposed in the housing 120 and is made in a way known to a person skilled in the art. The fastening device 130 is disposed at the end of the housing 120 and comprises a half shell, the inner contour of which corresponds to the outer contour of the handlebar tube.

To fasten the fastening device 10 to the handlebar tube 1, fastening bolts 61, 62 are inserted through the bolt supports and disposed in correspondingly designed supports in the fastening device 130 of the master cylinder 100 where they are fastened in a way known to a person skilled in the art, e.g., through a screw-thread connection, a press fit, etc. Alternatively, the fastening device 130 of the master cylinder 100 can also have studs that can be inserted through the bolt support 12, 13 of the fastening device 10 and secured in a suitable way.

The handlebar fastener has an adapter device 20 and an adapter support device 30.

A switchgear unit support device 24 is made at the end of the adapter device 20 and is adapted to a corresponding support of the switchgear unit.

The switchgear unit serves for actuating the gearing and is made in a way known to a person skilled in the art. The switchgear unit usually has two levers by which a cable can be tensioned or released, as a result of which the gearing can be switched in known manner.

The adapter support device 30 has a fork-like support that receives the adapter device 20. The fork-like support has a fork bottom 31 and two fork legs 32, 33, between which the adapter device 20 is disposed.

In the exemplary embodiment shown in FIGS. 1 to 7, the adapter device 20 is rotatably mounted, namely is rotatable about a bolt 39 that is disposed in the fork legs 32, 33.

The adapter device 20 comprises a bolt support device 21, in which a bolt support 23 is provided in the form of a through-hole. Other embodiments for the rotatable configuration of the adapter device 20 in the fastening device 10, which are known to a person skilled in the art, are conceivable.

At its end opposite to the bolt support device 21, the adapter device 20 has a switchgear unit support device 24 where the switchgear unit can be fastened.

The adapter device 20 has a torque support device 22, by which the adapter device 20 is supported on the handlebar tube 1. The advantage of this is that, when the switchgear unit, which is not shown in the drawings, is actuated, forces introduced into the adapter device 20 are not distributed to the fastening device 10 but directly to the handlebar tube 1, as a result of which no torque is exerted on the fastening device 10.

The torque support device 22 extends over an angular range of about 90 degrees.

The angular range of the torque support device 22 is substantially or fully below the plane 2, which extends through the center of the handlebar tube 1 and parallel to the direction of the force that, during switching, is exerted on the switchgear unit that usually has two levers (not shown) for switching up and down.

The switchgear unit is made such that it can be attached by a bolt 40 directly to the switchgear unit support device 24. The bolt 40 has a bolt head 41 having a tool engagement 43 and a bolt shaft 42. To fasten the switchgear unit, the bolt 40 is inserted with its bolt shaft 42 through a corresponding opening of the switchgear unit where it is held with the bolt head 41 thereof. The bolt shaft 42 is secured in the switchgear unit support device 24, e.g., in a threaded bore provided therein.

In the exemplary embodiment shown in FIGS. 1 to 7, an adjusting device 50 is provided at the switchgear unit support device 24 and is provided between the switchgear unit support device 24 of the adapter device 20 and the switchgear unit.

The adjusting device 50 has an adjusting wheel 52 having a stop set 51. The stop set 51 meshes with the switchgear unit support device 24, which has a substantially square cross-section. A switchgear unit support device 53 is provided on the top side of the adjusting wheel 52 and corresponds to the switchgear unit support device 24.

By rotating the adjusting wheel 52 prior to the assembly of the switchgear unit, the switchgear unit support device 53 can be rotated in relation to the switchgear unit support device 24, namely in angular steps predetermined by the stop set 51. In the exemplary embodiment shown, e.g., 12 positions are possible by the stop set, which corresponds to angular steps of 30 degrees. Alternatively or additionally to the stop set 51, a frictional engagement, e.g., in the form of striking surface pairs, can also be provided to create a finer adjusting possibility.

The further advantage of receiving the adapter device 20 in the fastening device 10 is that the fastening device 10 can accommodate various adapter devices 20 that are adapted to switchgear units with different supports. This serves to save costs because only smaller parts and not the entire fastening device have to be adapted.

Figure 8:
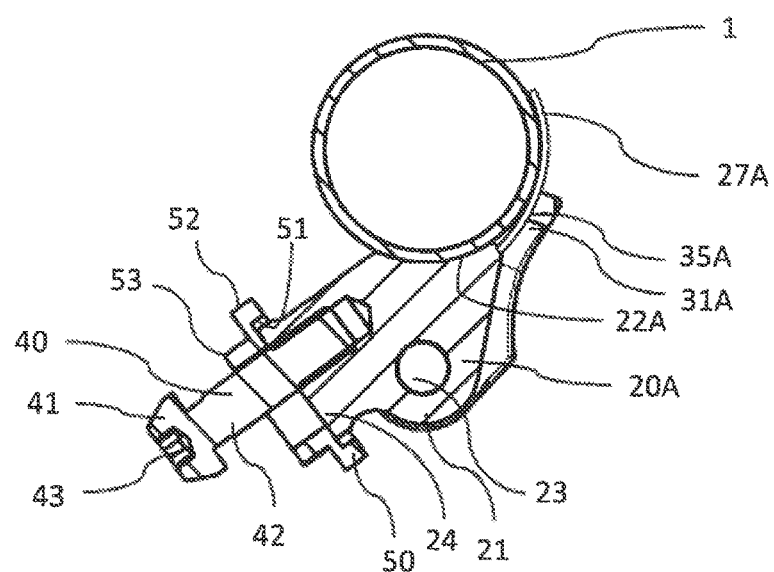
FIG. 8 is a vertical cross-sectional view of a further exemplary embodiment of a handlebar fastener.
Figure 9:
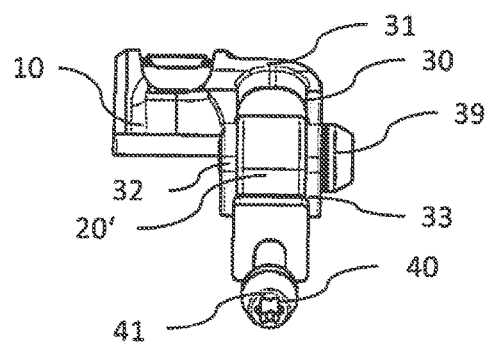
FIG. 9 is a top plan view of another exemplary embodiment of a handlebar fastener.
Figure 10:
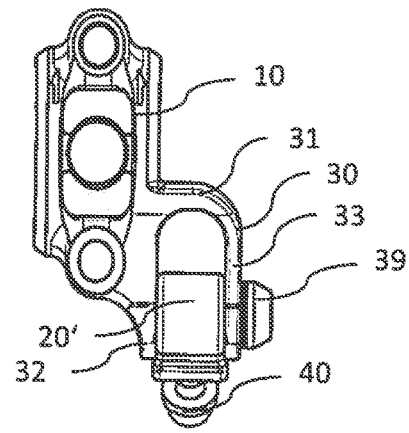
FIG. 10 is a rear elevational view of the handlebar fastener of FIG. 9 without the handlebar tube.
Figure 11:
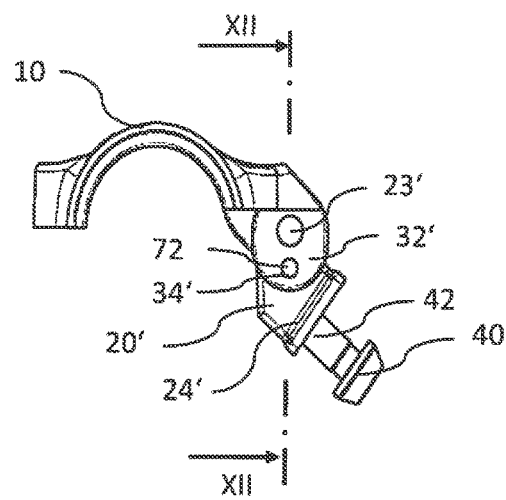
FIG. 11 is a side elevational view of the handlebar fastener of FIG. 9 without the handlebar tube.
Figure 12:
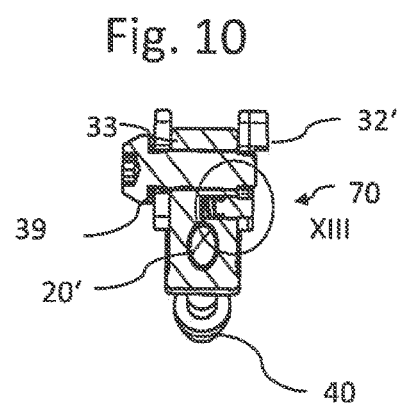
FIG. 12 is a cross-sectional view of the handlebar fastener of FIG. 9 along line XII-XII of FIG. 11.
Figure 13:
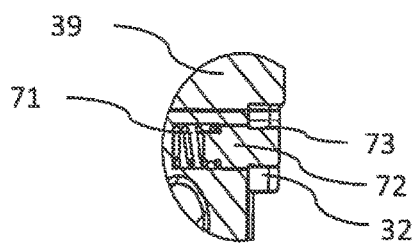
FIG. 13 is an enlarged, fragmentary view of a portion of the handlebar fastener within the circle XIII of FIG. 12.
Figure 14:
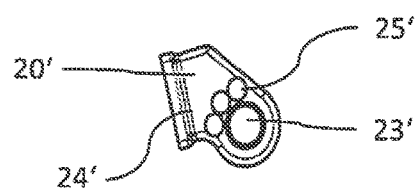
FIG. 14 is an elevational view of a detail of the adapter support device of the handlebar fastener of FIG. 9.
Figure 15:
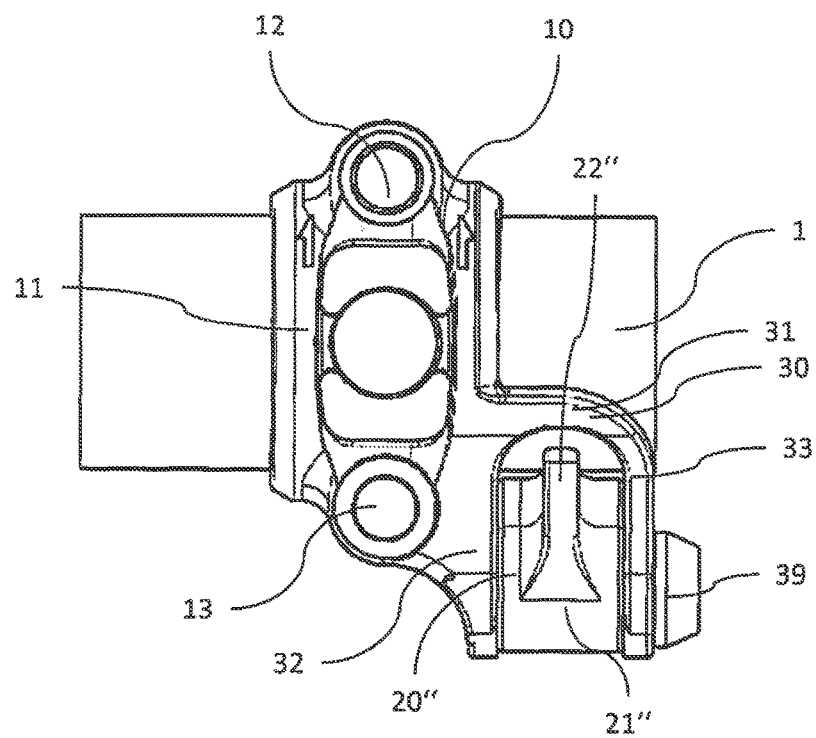
FIG. 15 is a rear elevational view of a further exemplary embodiment of a handlebar fastener.
Figure 16:
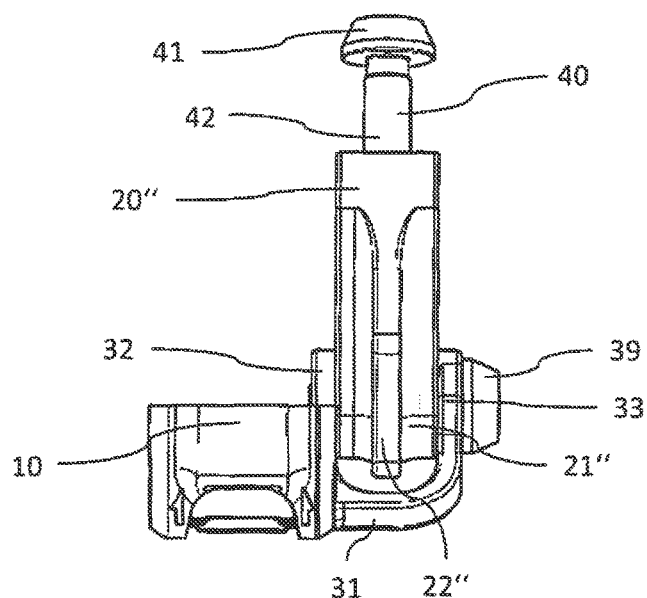
FIG. 16 is a top plan view of the handlebar fastener of FIG. 15.
Figure 17:
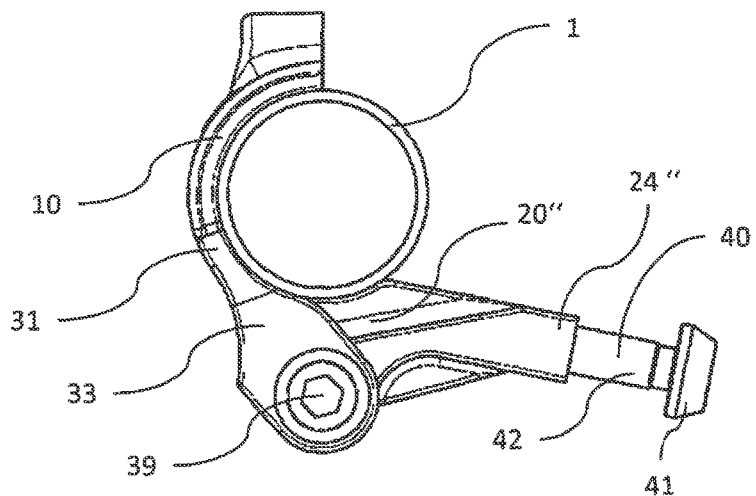
FIG. 17 is a side elevational view of the handlebar fastener of FIG. 15.
Figure 18:
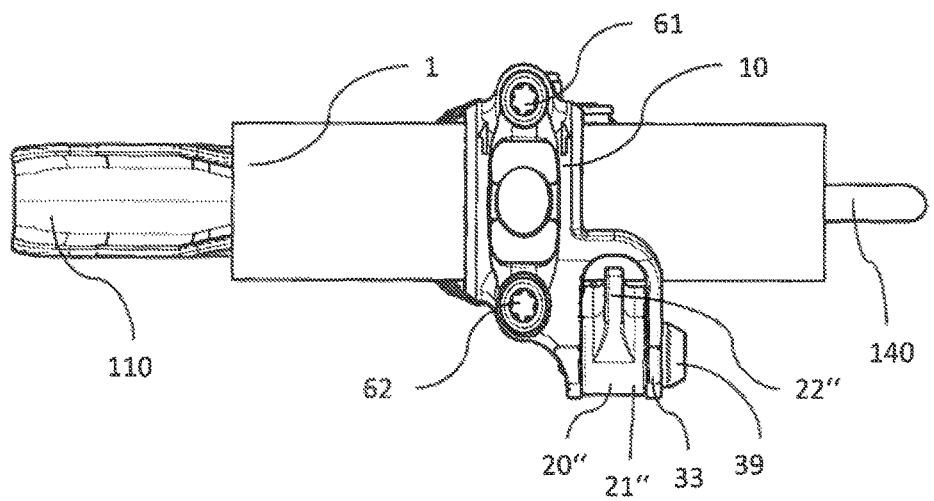
FIG. 18 is a fragmentary, rear elevational view of the handlebar fastener of FIG. 15 in the form of a master cylinder of a hydraulic bicycle brake.
Figure 19:
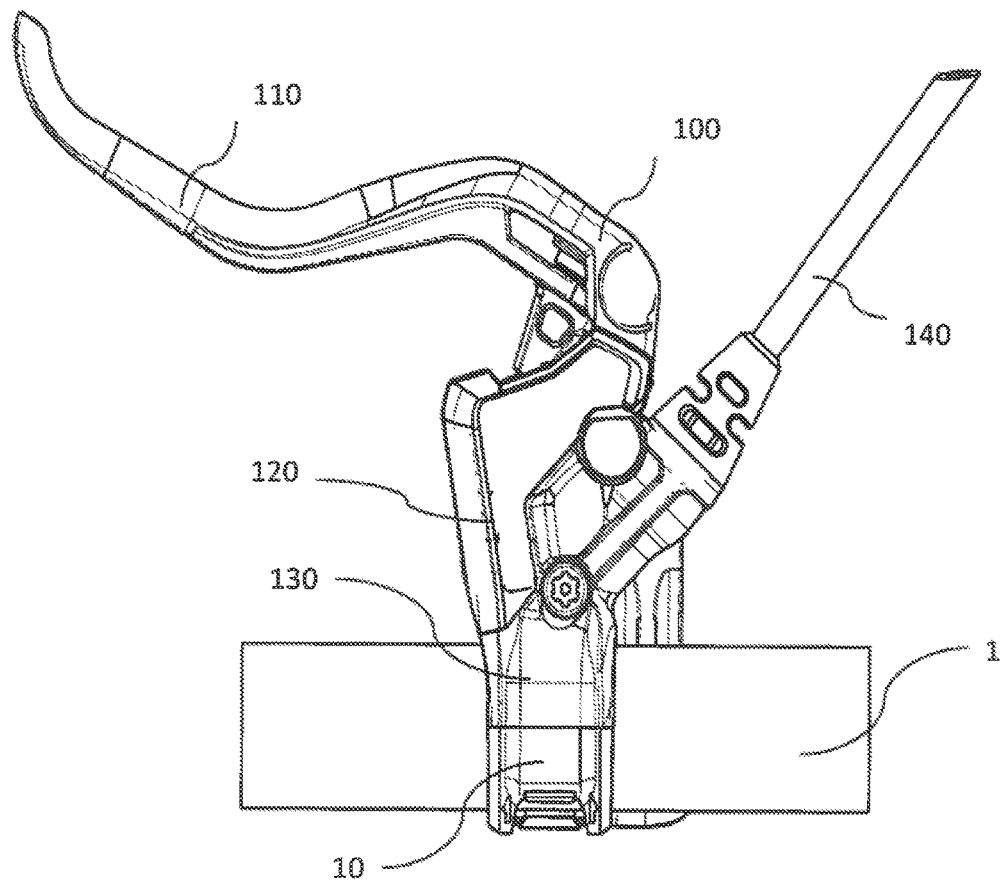
FIG. 19 is a fragmentary, top plan view of the handlebar fastener of FIG. 15 in the form of a master cylinder of a hydraulic bicycle brake attached to a handlebar tube section.
Figure 20:
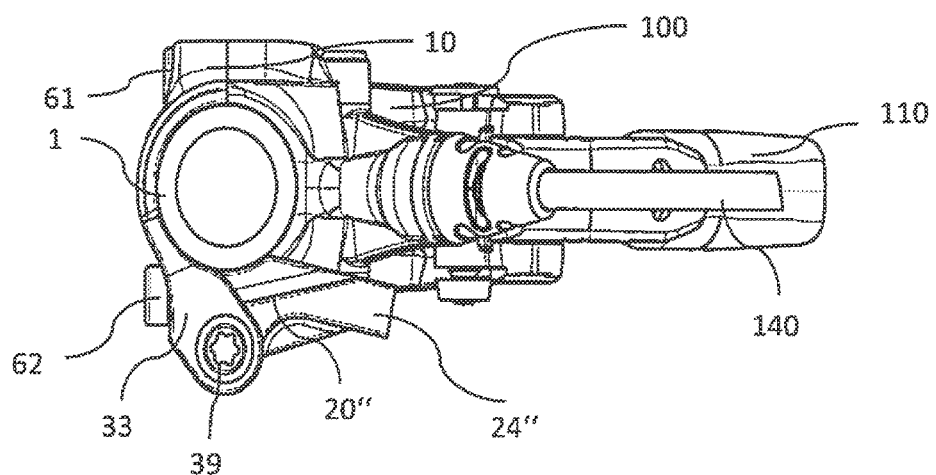
FIG. 20 is a side elevational view of the handlebar fastener of FIG. 15 in the form of a master cylinder of a hydraulic bicycle brake.
Figure 21:
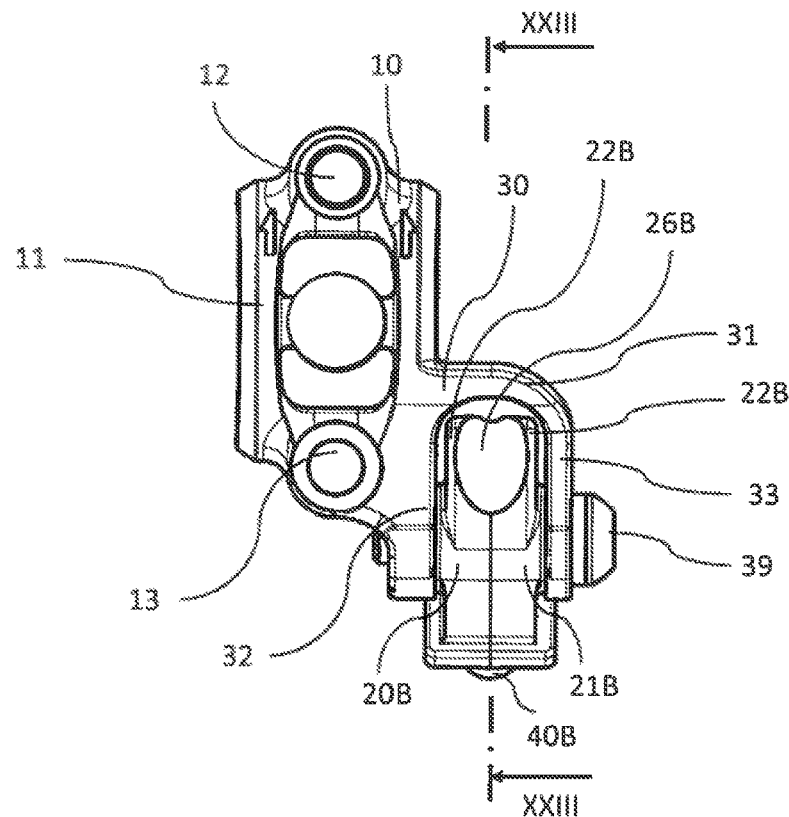
FIG. 21 is a rear elevational view of a further exemplary embodiment of a handlebar fastener.
Figure 22:
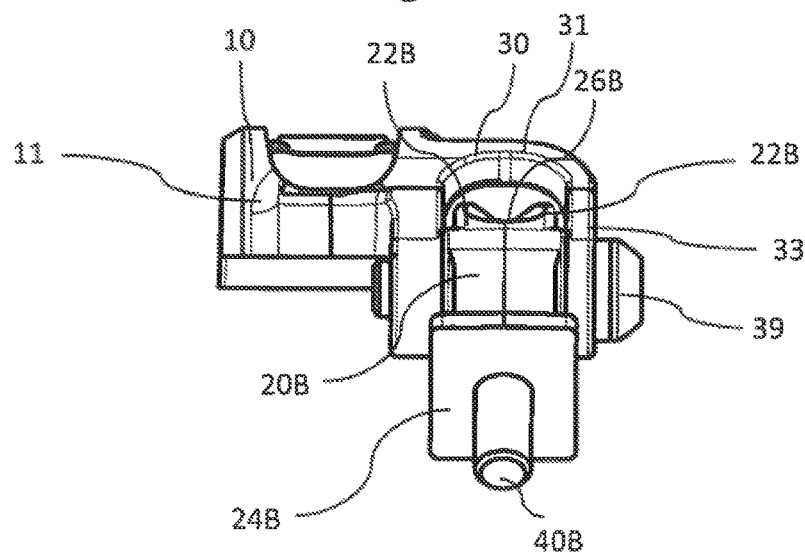
FIG. 22 is a top plan view of the handlebar fastener of FIG. 21.
Figure 23:
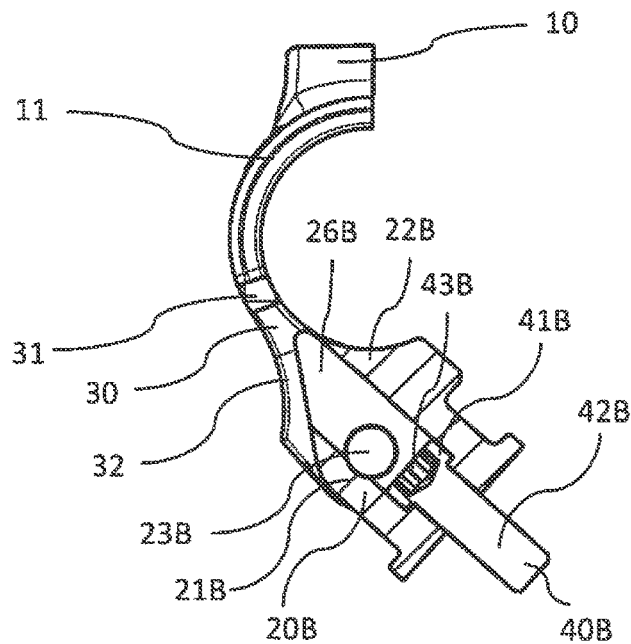
FIG. 23 is a cross-sectional view of the handlebar fastener of FIG. 21 along line XXIII-XXIII of FIG. 21.
Figure 24:
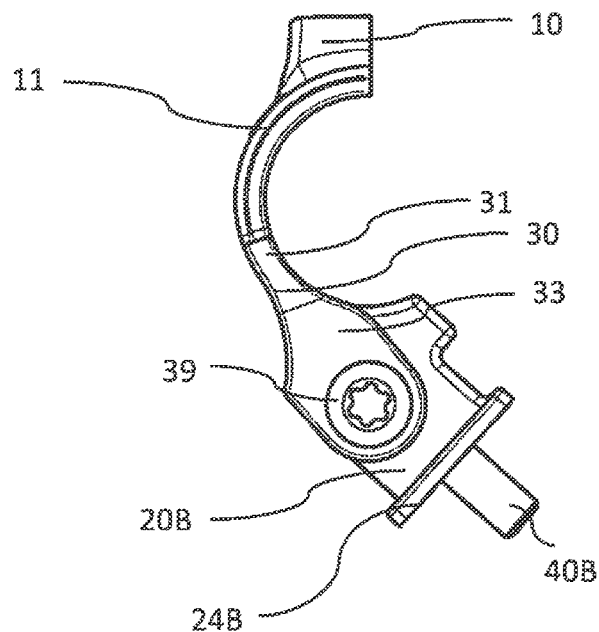
FIG. 24 is a side elevational view of the handlebar fastener of FIG. 21.

FIG. 8 shows a further exemplary embodiment of a handlebar fastener. This exemplary embodiment corresponds substantially to the exemplary embodiment shown in FIGS. 1 to 7, and therefore, reference is made to the description thereof and only the differences are described below. Corresponding or equal parts are here described with equal reference signs and terms, which sometimes are additionally provided with the letter A.

In addition to the exemplary embodiment described in connection with FIGS. 1 to 7, the exemplary embodiment shown in FIG. 8 has a second torque support region 27A. On the basis of the plane where the force exerted on the switchgear unit while shifting the gears extends, the second torque support region 27A is disposed on the rear or opposite side of the handlebar tube 1, such that the forces in the opposite direction can also be supported on the handlebar tube.

The second torque support region 27A has a rib that extends between the fork bottom 31A and the handlebar tube 1 to behind the handlebar tube 1 and through a passage 35A in the fork bottom 31A. The second torque support region 27A extends over about 90 degrees. Because the torque support device 22 also extends over about 90 degrees, the handlebar tube 1 is enclosed over about 180 degrees by these torque support regions.

FIGS. 9 to 14 show a further exemplary embodiment of a handlebar fastener. This exemplary embodiment corresponds substantially to the exemplary embodiment shown in FIGS. 1 to 7, and, therefore, reference is made to the description thereof and only the differences are described below. Equal or the same parts are described with the same reference signs and terms, which sometimes are additionally provided with an apostrophe.

In addition to the exemplary embodiment described in connection with FIGS. 1 to 7, the embodiment shown in FIGS. 9 to 14 has an adjusting device 70, by which it is possible to adapt an angle between the adapter device 20' and the fastening device 10.

The adjusting device 70 has a spring device 71 and a bolt 72, which are received in a corresponding opening or bore 25' that is provided in the adapter device 20'.

Bores 25' are provided around the bolt support 23', by which different angles can be adjusted between the adapter device 20' and the fastening device 10.

A corresponding opening 34' is provided in the fork leg 32', with which the end 73 of the bolt 72 meshes.

In the exemplary embodiment shown in FIGS. 9 to 14, no torque support is provided on the handlebar tube 1 in contrast to the embodiment of the drawings. The torque is here transmitted to the handlebar tube 1 through the fastening device and the frictional connection thereof with the handlebar tube 1.

FIGS. 15 to 20 show a further exemplary embodiment of a handlebar fastener. This exemplary embodiment corresponds substantially to the exemplary embodiment shown in FIGS. 1 to 7, and, therefore, reference is made to the description thereof and only the differences are described below. Corresponding or equal parts are here described with the same reference signs and terms, which sometimes are additionally provided with a double apostrophe.

In the exemplary embodiment of FIGS. 15 to 20, an alternative adapter device 20" is provided and is adapted to another switchgear unit. The switchgear unit support device 24" is narrower and longer than the switchgear unit support device 24 of the exemplary embodiment of FIGS. 1 to 7.

In the exemplary embodiment of FIGS. 15 to 20, no adjusting device 50 is provided and, therefore, the switchgear unit can be attached with the bolt directly to the switchgear unit support device 24" but only at a certain predetermined angle. It is evident that the exemplary embodiment shown in FIGS. 14 to 19 can also have an adjusting device 50 formed in accordance with the exemplary embodiment of FIGS. 1 to 7, the switchgear unit support device of which should then be formed in accordance with the switchgear unit support device 24".

FIGS. 21 to 24 show a further exemplary embodiment of a handlebar fastener. This exemplary embodiment corresponds substantially to the exemplary embodiment shown in FIGS. 1 to 7 and, therefore, reference is made to the description thereof and only the differences are described below. Corresponding or equal parts are here described with the same reference signs and terms, which sometimes are additionally provided with three apostrophes.

In the exemplary embodiment of FIGS. 21 to 24, the bolt 40B is configured such that the bolt shaft 42B is disposed in the direction of the switchgear unit where it can be screwed into a threaded hole provided in the switchgear unit in order to fasten the switchgear unit to the adapter device 20'''. Thereafter, the adapter unit 20''' can be disposed in the adapter support device 30 and fastened to the bolt 40B.

In this exemplary embodiment, the adapter device 20 includes an engagement opening 26B, through which the tool engagement 43B of the bolt head 41B can be reached in order to fasten the switchgear unit to the adapter device 20. Therefore, the torque support device 22B has two ribs, one on each side of the engagement opening 26B, which are substantially made to be similar to the rib of the exemplary embodiment shown in FIGS. 1 to 7, said latter rib being, however, provided in the center of the adapter device.

Of course, the systems, apparatuses, and methods are not limited to the illustrated embodiments. The above description is, therefore, not considered limiting but explanatory. The below claims are to be comprehended such that a feature addressed is available in at least one embodiment. This does not rule out the presence of further features.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A handlebar fastener for a switchgear unit, comprising: an adapter device has:
   a first switchgear unit support device shaped to receive the switchgear unit;
   an adjusting device including a stop set shaped to receive the first switchgear unit support device; and
   a second switchgear unit support device shaped to receive the switchgear unit; and
a fastening device configured to fasten the adapter device to a handlebar tube of a vehicle steered by handlebars, the adapter device having a torque support device:
   shaped and made to be supported off-center on the handlebar tube when the adapter device is fastened to the handlebar tube by the fastening device; and
   configured to direct to the handlebar tube any torque force introduced into the adapter device by actuation of the switchgear unit.

2. The handlebar fastener according to claim 1, wherein the fastening device comprises an adapter support device shaped to receive the adapter device.

3. The handlebar fastener according to claim 1, wherein the adjusting device is configured to adjust an angle at which the switchgear unit is received by the adapter device.

4. A master cylinder for a hydraulic brake comprising the handlebar fastener according to claim 1.

5. A handlebar fastener for a switchgear unit, comprising: an adapter device has:
   a first switchgear unit support device shaped to receive the switchgear unit;
   an adjusting device including a stop set shaped to receive the first switchgear unit support device; and
   a second switchgear unit support device shaped to receive the switchgear unit; and
a fastening device configured to fasten the adapter device to a handlebar tube of a vehicle steered by handlebars, the fastening device having an adapter support device shaped to receive the adapter device, and the adapter device having a torque support device:
   shaped and made to be supported off-center on the handlebar tube when the adapter device is fastened to the handlebar tube by the fastening device; and
   configured to direct to the handlebar tube any torque force introduced into the adapter device by actuation of the switchgear unit.

6. The handlebar fastener according to claim 5, wherein the adapter device is rotatably mounted in the adapter support device.

7. The handlebar fastener according to claim 5, wherein:
   the handlebar tube has an axis; and
   the adapter device is rotatably mounted in the adapter support device about an axis that extends substantially parallel to the axis of the handlebar tube.

8. The handlebar fastener according to claim 5, wherein the adapter device has a switchgear unit support device shaped to receive the switchgear unit.

9. The handlebar fastener according to claim 5, wherein the adjusting device is configured to adjust an angle at which the switchgear unit is received by the adapter device.

10. A master cylinder for a hydraulic brake comprising the handlebar fastener according to claim 5.

* * * * *